Oct. 4, 1966   O. J. BIRKESTRAND   3,276,627
METHOD AND APPARATUS FOR FLUIDIZING
A MASS OF DISCRETE PARTICLES
Filed Oct. 26, 1964

INVENTOR.
ORVILLE J. BIRKESTRAND
BY
Morse, Altman & Oates
ATTORNEY

United States Patent Office 3,276,627
Patented Oct. 4, 1966

3,276,627
METHOD AND APPARATUS FOR FLUIDIZING A MASS OF DISCRETE PARTICLES
Orville J. Birkestrand, Watertown, Mass.
(49 Washington St., Hudson, Mass.)
Filed Oct. 26, 1964, Ser. No. 406,456
9 Claims. (Cl. 222—1)

This invention relates generally to the handling and processing of discrete particles and more particularly is directed towards a novel method and associated apparatus for fluidizing a mass of discrete particles by passing a fluid medium through the mass in such a manner as to completely fluidize the mass so that a highly efficient interaction is obtained between the two mediums.

In the processing of a mass of discrete particles it is desirable that the same be fluidized for ease of handling and for efficient interaction between the particles and the reactive medium. Various systems have been employed heretofore in an attempt to achieve a uniformly complete exposure of all particles in the fluidized mass to the same reaction driving forces whether these forces be temperature, velocity, mass gradients, or the like. One of the purposes of this method is essentially to achieve a well mixed plug flow reaction: plug flow in a longitudinal direction and well mixed flow in the $r$ and $\theta$ directions. Heretofore, both methods and the systems employed for these purposes have been unsatisfactory for one reason or another. For example, most systems of this type were subject to channeling with the result that the mass was not fully fluidized and the particles were not uniformly processed nor could a well mixed plug flow be achieved. Also, prior systems were subject to clogging requiring frequent shutdowns for the system to be cleared. Further problems with some existing systems are that the process is not readily controllable, are mechanically complicated and expensive to fabricate and maintain, and a relatively large percentage of the materials must be recovered from the exiting fluid medium during the processing operation.

Accordingly, it is an object of the present invention to provide improvements in both the method and apparatus for fluidizing a mass of discrete particles.

Another object of this invention is to provide an efficient and compact system for completely and uniformly dispersing one fluid medium through another fluid medium both of which are of a different character.

A more specific object of this invention is to provide a novel method for passing a gaseous medium through a mass of fluidized solid particles.

Another specific object of this invention is to provide a novel apparatus for use in the continuous processing of fluidized solid particles by means of a fluid reactive medium.

More particularly, this invention features a novel method for continuously processing one fluid medium, such as discrete solid particles, with another fluid medium, such as a gas, by feeding one of the mediums in an axial direction and directing the other medium in a series of high velocity streams directed inward in one rotary direction and generally tangentially to a circle in the annular region to cause the first medium to rotate in a floating mass of fluidized particles. These streams, when they approach this circle are then forced by their mutual interaction into a circular path. When the fluid approaches the axis of the rotating mass it is then caused to reverse its direction and to exhaust axially outward of the rotating mass.

This invention also features a novel apparatus for continuously processing one fluid medium, such as discrete solid or liquid particles, with another fluid medium, such as a gas, which apparatus comprises a conduit having an annular passageway through which the first medium is passed, a housing disposed about the conduit to accommodate the second fluid medium, guide vanes disposed about the conduit in communication with the annular passage for directing the second medium into the annular passage more or less chordally to the annular passage, an inner conduit defining an axial passage concentric with the annular passage and provided with reversely directed vanes connected therewith whereby the second fluid medium will impart a rotary moment to the first fluid medium as it is moved axially along the passage. The arrangement is such that the particles of the first medium contained in the annular region are completely fluidized and exposed uniformly to a high velocity, highly turbulent fluid flow to produce a uniform fast overall reaction between the two mediums.

However, these and other features of the invention, along with further objects and advantages thereof, will become more fully apparent from the following detailed description of a preferred embodiment of the invention, with reference being made to the accompanying drawings, in which.

Figure 1:
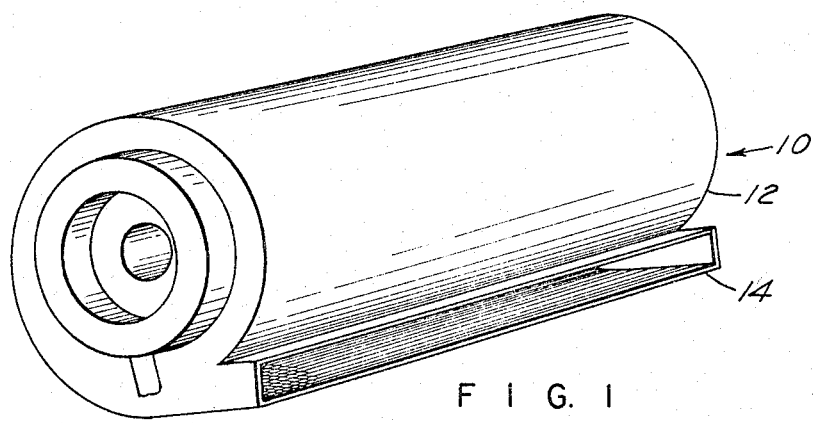
FIG. 1 is a view in perspective of a fluidization device made according to the invention.

Referring now to the drawings, the reference character 10 generally indicates a cyclonic fluidization device having a spiral outer housing 12 with an integral inlet duct 14 formed tangentially therein and extending substantially the full length of the housing. Mounted in spaced coaxial relation within the housing 12 is a tubular conduit 16 defining a passage 18 about the outer periphery of the conduit. The conduit 16 will be seen in FIG. 3 to be formed with a plurality of spaced vanes 20 which define longitudinal openings 22 between the passage 18 and the interior of the conduit 16. These vanes are so formed as to be directed chordally in the same rotary direction through the conduit more or less tangentially to a circle in this annular region which is concentric with the inner conduit 24. It will be seen in FIG. 3 that the inner conduit 24 is also formed with a plurality of spaced guide vanes 26 oriented in a direction reverse to the vanes 20 and forming a plurality of openings 28 in communication with an axial passage 30 therethrough. A vortex stop plate 32 (FIG. 2) for longer models is formed midway along the passage 30 and it will be noted that each half of the passage is open at opposite ends through which flows the exiting fluid medium.

Figure 2:
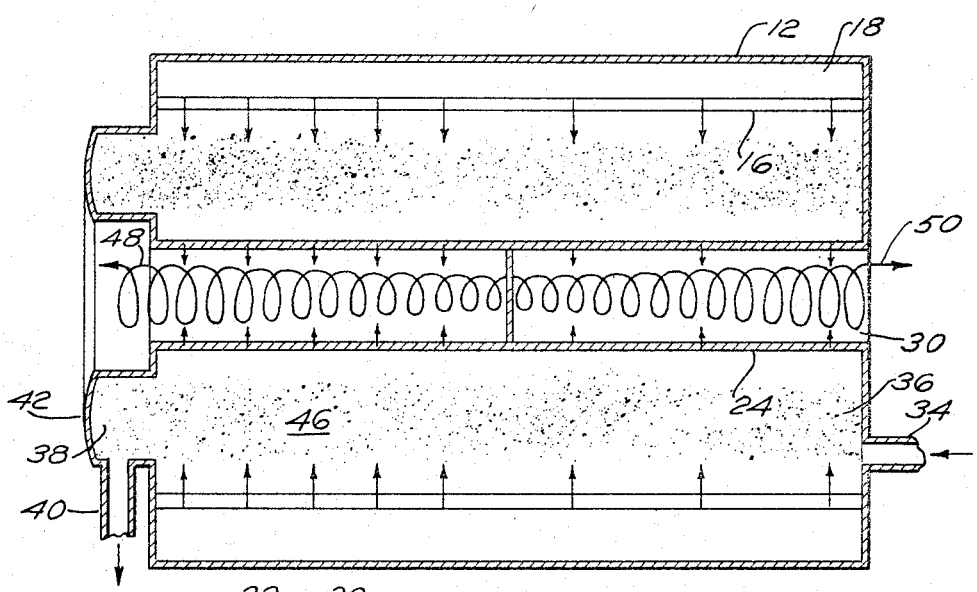
FIG. 2 is a sectional view in side elevation of the FIG. 1 device.
Figure 3:
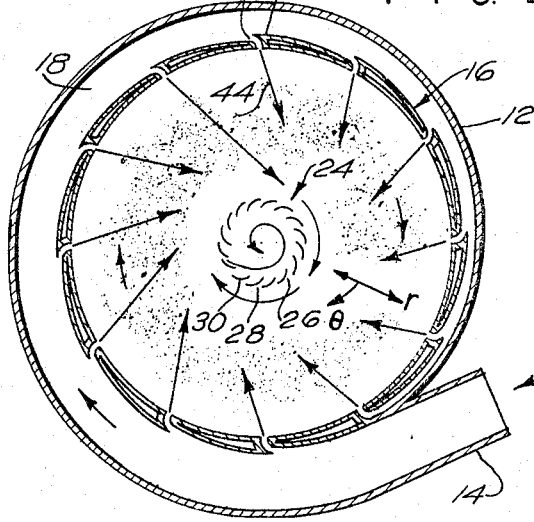
FIG. 3 is a sectional view in end elevation of the device.

On the right-hand end of the housing 12, as viewed in FIG. 2, is an inlet port 34 communicating with an annular passage 36 formed between the conduits 16 and 24. On the left-hand side of the device, as viewed in FIG. 2, an annular recess 38 is formed in the end wall and is provided with a radial discharge port 40. The end walls may be slightly concave as at 42 for reasons that will presently appear.

In operation, the discrete particles which take part in the processing are fed into the device through the inlet port 34, the characteristics of the incoming fluid medium streams being designed to keep the discrete particles away from the outer conduit 16. The unit may be employed for processing many different materials. For example, the unit would be particularly useful in the drying of grain foods such as wheat, barley or the like. For this purpose an air tight screw feeder or some other apparatus may be employed to deliver a continuous flow of the grain into the annular passage 36 through the duct 34. The processed material will discharge through the left-hand port 40.

When used as a grain dryer, warm air is pumped continuously into the unit through the inlet duct 14. This air enters the passage 18 substantially surrounding the outer conduit 16 and flows into the annular passage 36 through the openings 22 in directions indicated by arrows 44 in FIG. 3. In practice, the air is delivered under high velocity so that a plurality of high velocity air streams are directed into the annular passage 36 in directions generally tangential to a geometrical circle concentric with the conduit 24. With both the air and the grain being fed into the unit through their respective inlets, the grain will be caused to be rotated about the central axis of the unit and will form a floating, rotating, annular mass of fluidized particles. The grain particles will be kept away from the conduit 16 by means of the high velocity air streams directed inwardly by the guide vanes 20. These high-speed air streams will deflect the grain particles sufficiently to keep them in the floating annulus and are all directed generally tangentially to a circle in the annulus. Between this circle and the vanes 26, the air flow may be described as somewhat like free vortex flow, i.e., $V.R.^n$=constant, with generally $$0.5 \leq n \leq 1$$

Near these exit vanes 26 the air will develop a high tangential velocity and will give any grain particles in this vicinity a centrifugal force which will be large in relation to the inward drag force created by the radial gas flow and will cause these grain particles to move outwards and away from this region.

The pressure gradient across the discharge guide vanes 26 will force the air through the openings 28 and cause it to change its direction of rotation. By arranging the guide vanes 26 in this fashion the air flow reversal is localized as much as possible and the entrainment of the solid grain particles in the exit gaps is reduced. The vortex stop plate 32 placed in the center of the gas exit passage 30 insures that the gases will flow out each end as indicated by the arrows 48 and 50. The grain particles thus move in a helical path through the annular passage 36 while the air flow is tangentially inward until it reaches the concentric circle where it becomes rotational until it passes into the conduit 24 where it exhausts axially out of the unit in opposite directions. As indicated previously, the grain particles discharge from the left-hand side of the unit as viewed in FIG. 2 and the annular recess 38 is located out of the direct flow so that the rotating grain particles will gradually lose momentum in this recess and may be withdrawn through the duct 10 without serious particle abrasion or erosion of the machine components. The end walls 42 and 43 are bowed outwardly to increase the fluid boundary layers on these surfaces to eliminate or reduce a possible source of machine erosion.

Since the main flow of the grain particles will be rotary with a relatively small longitudinal component, it is easier to predict and to regulate more uniformly the retention time of a particular grain particle in the system and can be generally described as a well mixed plug flow of the fluidized particles. The longitudinal flow of grain particles will be akin to a diffusion process and if a faster flow of grain particles is desired through the machine, the device may be tilted slightly towards the discharge end to impose a component of the gravitational field on the particles in this direction.

In practice, the heavier grain particles will normally rotate near the outside of the floating annulus and therefore these heavier particles will be exposed to the incoming air streams. This means that the particles requiring the most reaction will be exposed to the strongest reaction driving forces. When used as a grain dryer, these heavier particles would be the wetter grains. Occasionally grain particles will strike the outer guide vanes 20. However, by the time they reach the vanes their radial velocity will have lowered considerably from having to pass through several of the high speed air streams discharging through the vanes 20. Interparticle abrasion may be reduced if the system is sufficiently loaded to form a dense mass of fluidized grain particles and more and thinner high velocity fluid streams are employed, the purpose being to make the velocities of the grain particles as uniform as possible.

It will be understood that the entire surface of all grain particles will be exposed to similar reaction driving forces whether these be temperature, velocity or mass gradients and the like. A large solid-mass/fluid-mass ratio of gas-solid contact may be achieved in a relatively short time without any appreciable loss of solids through the gas exit stream. Also the solids retention time may be easily and uniformly regulated independently of the fluid mass flow through the system.

One of the main advantages of the system is that not only are the grain particles fluidized, but that they are exposed uniformly to a high velocity and highly turbulent flow thereby producing a more uniform and faster overall reaction rate than can be achieved in either a conventional packed or fluidized bed system. The system by reason of the cyclonic fluidization substantially eliminates channeling, plugging or undesirable saltation of the particles, and can achieve essentially a well mixed plug flow reaction of the fluidized particles. These advantages thus provide a more economical process per unit mass of product output.

While the unit has been described in connection with gas-solid applications, with air and grain being a typical example, it may also be employed for a number of other purposes such as flour bleaching for example in which the flour is passed through the annular chamber 36 and and the bleaching medium fed in through the passage 18. Also, the invention may be employed in gas-liquid applications. It will be understood that the liquid may be sprayed into the chamber 36 through the entrance 34 and high speed gas jets entering through guide vane openings 22 would tend to break up any agglomeration of the particles. High centrifugal forces near the exit vanes and at the center will keep the droplets out of the exit gas. Any droplets that may be carried into the exit stream would be spun back into the particle chamber by way of the exit stream vortex.

While the invention has been described with particular reference to the illustrated embodiment, it will be understood that numerous modifications thereto will appear to those skilled in the art. For example, in place of a pressure pump to force air or gas through the vanes, a vacuum pump may be connected to the discharge conduit 24 in order to get the desired result. Accordingly, the above description and accompanying drawings should be taken as illustrative of the invention and not in a limiting sense.

Having thus described the invention, what I claim and desire to obtain by Letters Patent of the United States is:

1. Apparatus for fluidizing a mass of discrete particles, comprising
   (a) a first tubular conduit,
   (b) a second tubular conduit extending in spaced coaxial relation through said first conduit and forming therewith an annular passage for said particles,
   (c) said second conduit being formed with a plurality of spaced openings therethrough,
   (d) said openings being directed in one rotary direction chordally through said second conduit,
   (e) said first conduit being formed with a plurality of spaced openings,
   (f) the openings in said first conduit being directed in a rotary direction opposite to the openings in said second conduit, and (g) means for delivering a fluid medium through the first conduit openings to rotate and fluidize said mass, said medium exhausting through said second conduit.

2. Apparatus for fluidizing a mass of discrete particles, comprising
   (a) a first cylindrical tubular conduit,
   (b) a second cylindrical tubular conduit extending in spaced coaxial relation through said first conduit and forming therewith an annular passage for said particles,
   (c) the cylindrical walls of said second conduit being formed with a plurality of spaced opening therethrough,
   (d) said openings being directed in one rotary direction chordally through said second conduit,
   (e) the cylindrical walls of said first conduit being formed a with a plurality of spaced openings,
   (f) the openings in said first conduit being directed in a rotary direction opposite to the openings in said second conduit, and
   (g) guide means for delivering a fluid medium in streams through the first conduit openings to rotate and fluidize said mass, said medium passing inwardly through said mass and exhausting through said second conduit.

3. Apparatus according to claim 2 including a wall mounted across said second conduit generally midway therealong for directing the exhausted medium in axially opposite directions.

4. Apparatus according to claim 2 including a housing enclosing at least the outer cylindrical portion of said first conduit and defining therewith an annular chamber for said fluid medium.

5. Apparatus according to claim 2 including an end wall at the discharge end of said annular passage, said end wall being formed with a concentric annular recess out of the path of said medium wherein said particles may decelerate prior to discharge.

6. Apparatus for fluidizing a mass of discrete particles, comprising
   (a) a first tubular conduit,
   (b) a second tubular conduit extending in spaced coaxial relation through said first conduit and forming therewith an annular passage for said particles,
   (c) said second conduit being formed with a plurality of openings therethrough,
   (d) said first conduit being formed with a plurality of spaced longitudinal openings,
   (e) the openings in said first conduit being directed in one rotary direcion generally tangential to said second conduit, and
   (f) means for delivering a fluid medium through the first conduit openings to rotate and fluidize said mass, said medium passing through said mass and exhausting through said second conduit.

7. Apparatus according to claim 6 including inwardly concave end walls disposed at opposite ends of said annular passage.

8. The method of fluidizing a mass of discrete particles, comprising the steps of
   (a) forming said mass into an annular configuration,
   (b) applying an axial component of force to move said mass in an axial direction,
   (c) injecting a fluid medium under pressure at spaced points about the annular mass chordally inwards of said mass to impart a rotary component to said mass, and
   (d) exhausting said fluid medium along the axis of said mass separately from said mass.

9. The method of fluidizing a mass of discrete particles, comprising the steps of
   (a) advancing said mass through an annular path,
   (b) introducing a fluid medium under pressure at spaced points about the annular mass directed chordally inwards of said mass and in one rotary direction to impart a rotary component to said mass, and
   (c) exhausting said fluid medium along the axis of said mass separately from said mass.

References Cited by the Examiner
UNITED STATES PATENTS

| | | | |
|---|---|---|---|
| 2,527,466 | 10/1950 | Townsend et al. | 302—29 |
| 2,677,579 | 5/1954 | Kilpatrick | 302—57 |
| 2,792,971 | 5/1957 | Kaiser | 222—193 |

ROBERT B. REEVES, *Primary Examiner.*

STANLEY H. TOLLBERG, *Examiner.*